US010315448B2

(12) United States Patent
Stahl

(10) Patent No.: US 10,315,448 B2
(45) Date of Patent: Jun. 11, 2019

(54) METHOD FOR CREATING FULL COLOR HEAT ACTIVATED TRANSFERS

(71) Applicant: GroupeSTAHL, Sterling Heights, MI (US)

(72) Inventor: Brett Stahl, Sterling Heights, MI (US)

(73) Assignee: STAHLS' INC., Sterling Heights, MI (US)

( * ) Notice: Subject to any disclaimer, the term of this patent is extended or adjusted under 35 U.S.C. 154(b) by 0 days.

(21) Appl. No.: 15/937,345

(22) Filed: Mar. 27, 2018

(65) Prior Publication Data

US 2018/0281491 A1   Oct. 4, 2018

Related U.S. Application Data

(60) Provisional application No. 62/477,779, filed on Mar. 28, 2017.

(51) Int. Cl.
*B41M 3/12* (2006.01)
*B41M 5/00* (2006.01)
(Continued)

(52) U.S. Cl.
CPC ............. *B41M 3/12* (2013.01); *B32B 38/04* (2013.01); *B41J 11/666* (2013.01);
(Continued)

(58) Field of Classification Search
CPC .... B41J 11/666; B41M 2205/36; B41M 3/12; B41M 5/0047; B41M 5/0064;
(Continued)

(56) References Cited

U.S. PATENT DOCUMENTS 5,312,645 A * 5/1994 Dressler ................ A41D 27/08
347/100
6,143,115 A   11/2000 Sammis
(Continued)

FOREIGN PATENT DOCUMENTS

EP   1151871 A1   11/2001
EP   1136972 B1   2/2006

OTHER PUBLICATIONS

International Search Report dated Jul. 13, 2018 relating to International Application No. PCT/US2018/024812.
(Continued)

*Primary Examiner* — Sonya M Sengupta
(74) *Attorney, Agent, or Firm* — Harness, Dickey & Pierce PLC

(57) ABSTRACT

The present disclosure provides a method for transferring an image to a substrate that includes providing a transfer medium having at least one registration mark; printing an image on the transfer medium; covering the image with a backing layer, the backing layer not covering the registration mark; covering the backing layer with an adhesive layer; penetrating the adhesive layer and the backing layer with a cutting device at locations around the image, the penetrating of the adhesive layer and backing layer not penetrating the transfer medium; removing portions of the adhesive layer and backing layer from the locations around the image; and transferring the image to the substrate.

21 Claims, 5 Drawing Sheets

(51) Int. Cl.
  *B44C 1/16*    (2006.01)
  *B32B 38/00*   (2006.01)
  *B32B 38/04*   (2006.01)
  *B41J 11/66*   (2006.01)

(52) U.S. Cl.
  CPC ........ *B41M 5/0047* (2013.01); *B41M 5/0064* (2013.01); *B44C 1/16* (2013.01); *B29C 2793/00* (2013.01); *B29C 2793/0054* (2013.01); *B32B 38/0004* (2013.01); *B32B 2038/045* (2013.01); *B32B 2038/047* (2013.01); *B41M 2205/36* (2013.01); *Y10T 156/108* (2015.01); *Y10T 156/1052* (2015.01); *Y10T 156/1064* (2015.01)

(58) Field of Classification Search
  CPC ........ B29C 2793/00; B29C 2793/0054; B29C 65/749; B32B 38/0004; B32B 38/04; B32B 2038/045; B32B 2038/047; Y10T 156/1052; Y10T 156/1064; Y10T 156/108
  USPC .......................... 156/249, 250, 257, 267, 268
  See application file for complete search history.

(56) References Cited

U.S. PATENT DOCUMENTS

| | | | | |
|---|---|---|---|---|
| 6,149,753 | A * | 11/2000 | Huang | ............... B32B 38/10 156/230 |
| 2003/0035933 | A1* | 2/2003 | Stahl | .................... B41M 3/12 428/195.1 |
| 2004/0223044 | A1 | 11/2004 | Oshima et al. | |
| 2008/0233324 | A1* | 9/2008 | Lee | ........................ B41M 3/12 428/40.1 |
| 2016/0221304 | A1* | 8/2016 | Schwendiman | ....... B41M 5/502 |

OTHER PUBLICATIONS

Written Opinion dated Jul. 13, 2018 relating to International Application No. PCT/US2018/024812.

* cited by examiner

METHOD FOR CREATING FULL COLOR HEAT ACTIVATED TRANSFERS

CROSS-REFERENCE TO RELATED APPLICATIONS

This application claims the benefit of U.S. Provisional Application No. 62/477,779, filed on Mar. 28, 2017. The entire disclosure of the above application is incorporated herein by reference.

FIELD

The present disclosure relates to a method for creating full color heat activated transfers.

BACKGROUND

This section provides background information related to the present disclosure which is not necessarily prior art.

Screen printing is a printing technique whereby a mesh is used to transfer ink onto a substrate, except in areas made impermeable to the ink by a blocking stencil. A blade or squeegee is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed.

Screen printing can also be a stencil method of print making in which a design is imposed on a screen of polyester or other fine mesh, with blank areas coated with an impermeable substance. Ink is forced into the mesh openings by the fill blade or squeegee and by wetting the substrate, transferred onto the printing surface during the squeegee stroke. As the screen rebounds away from the substrate the ink remains on the substrate. It is also known as silk-screen, screen, serigraphy, and serigraph printing. One color is printed at a time, so several screens can be used to produce a multicolored image or design. Such a process, however, is time-consuming and costly due to the use of multiple screens that are needed for multicolor images.

SUMMARY

This section provides a general summary of the disclosure, and is not a comprehensive disclosure of its full scope or all of its features.

The present disclosure provides a method for transferring an image to a substrate that includes providing a transfer medium having at least one registration mark; printing an image on the transfer medium; covering the image with a backing layer, the backing layer not covering the registration mark; covering the backing layer with an adhesive layer; penetrating the adhesive layer and the backing layer with a cutting device at locations around the image, the penetrating of the adhesive layer and backing layer not penetrating the transfer medium; removing portions of the adhesive layer and backing layer from the locations around the image; and transferring the image to the substrate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
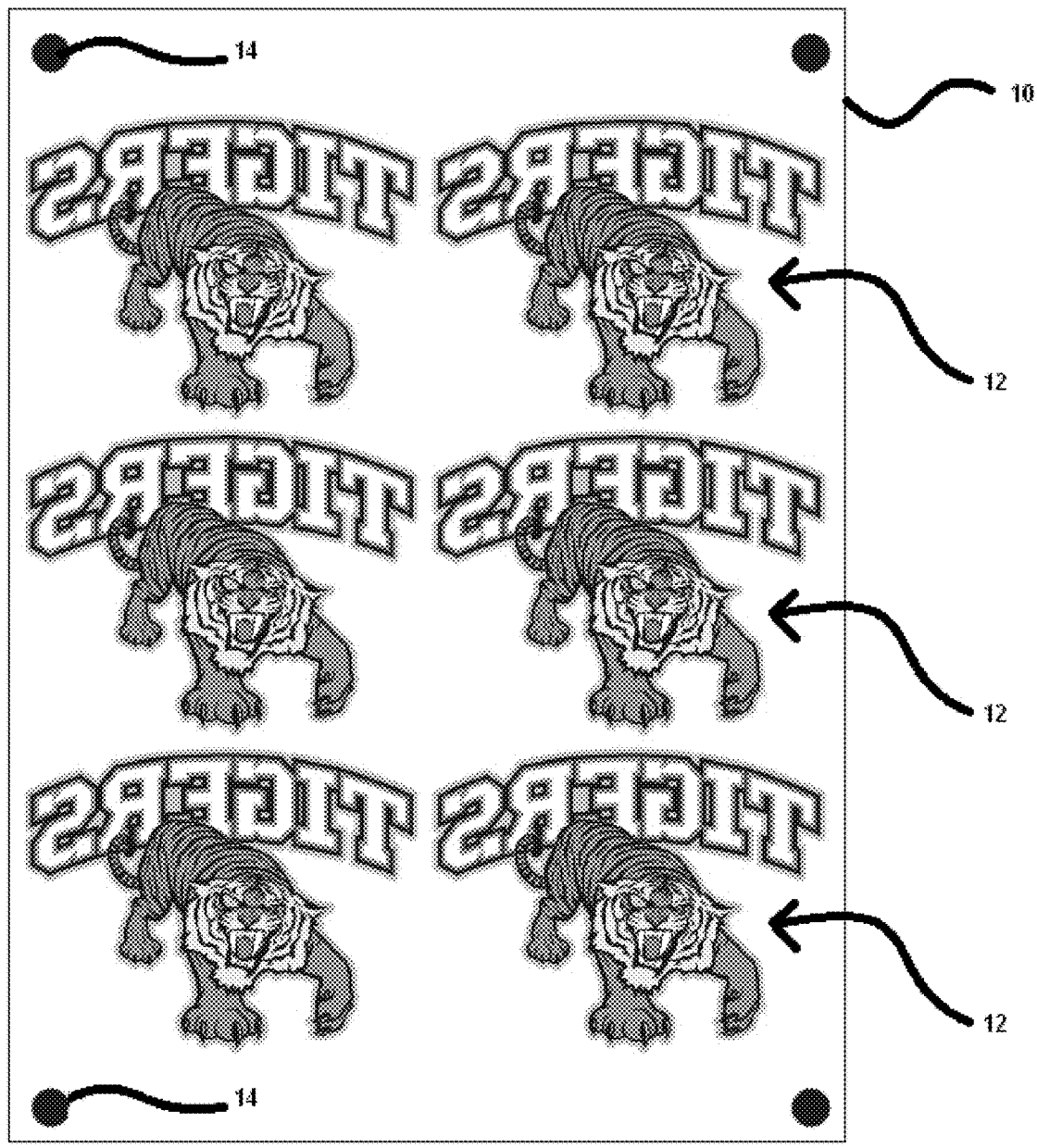
FIG. 1 is a perspective view of release film having a plurality of transferrable images printed thereon.

FIG. 1 illustrates a transfer medium or release film 10 having a plurality of images 12 printed thereon. Images 12 may be formed on release film 10 using any method known to one skilled in the art. A preferable method of forming images 12 on release film 10 is an ink jet printing method that provides a high degree of detail and accuracy when printing the images 12. It should be understood, however, that other known methods of printing the images such as bubble jet methods, toner printing methods, roller printing methods, and the like are contemplated. Images 12 can be printed in a mirror-image, or be printed normally.

Release film 10 may be formed from a transparent material, but the present disclosure should not be limited thereto. Materials that may be used to form release film include polymeric materials such as polyvinyl chloride materials, polyethylene, polypropylene, polyvinyl alcohol, and other materials known to one skilled in the art. The release film 10 may additionally include an ink-receiving layer (not shown) that has various properties to prevent bleeding of the inks, or is formed of a material that reacts with various components of the inks such as surfactants, solvents, pigments, dyes, polymer particles (if any), and the like.

There is no limitation on the type of ink that may be used to form images 12. In this regard, the inks used to form images 12 may be aqueous inks, or solvent-based inks that do not substantially contain water. In addition, the inks selected to form images 12 may include color materials that are pigment-based, or dye-based. If a pigment-based ink is selected, it is contemplated that the inks may include a metallic pigment. Moreover, as noted above, the inks may include various surfactants, solvents, polymer particles, and the like as are known to one skilled in the art.

As illustrated in FIG. 1, release film 10 includes a plurality of registration marks 14. Registration marks 14 may be printed along with images 12. Alternatively, registration marks 14 may be apertures formed in release film 10 before or after forming images 12. Registration marks 14 are used to align a cutting device (not shown) that is used in a subsequent step of the method according to the present disclosure, as will be described in more detail later.

Figure 2:
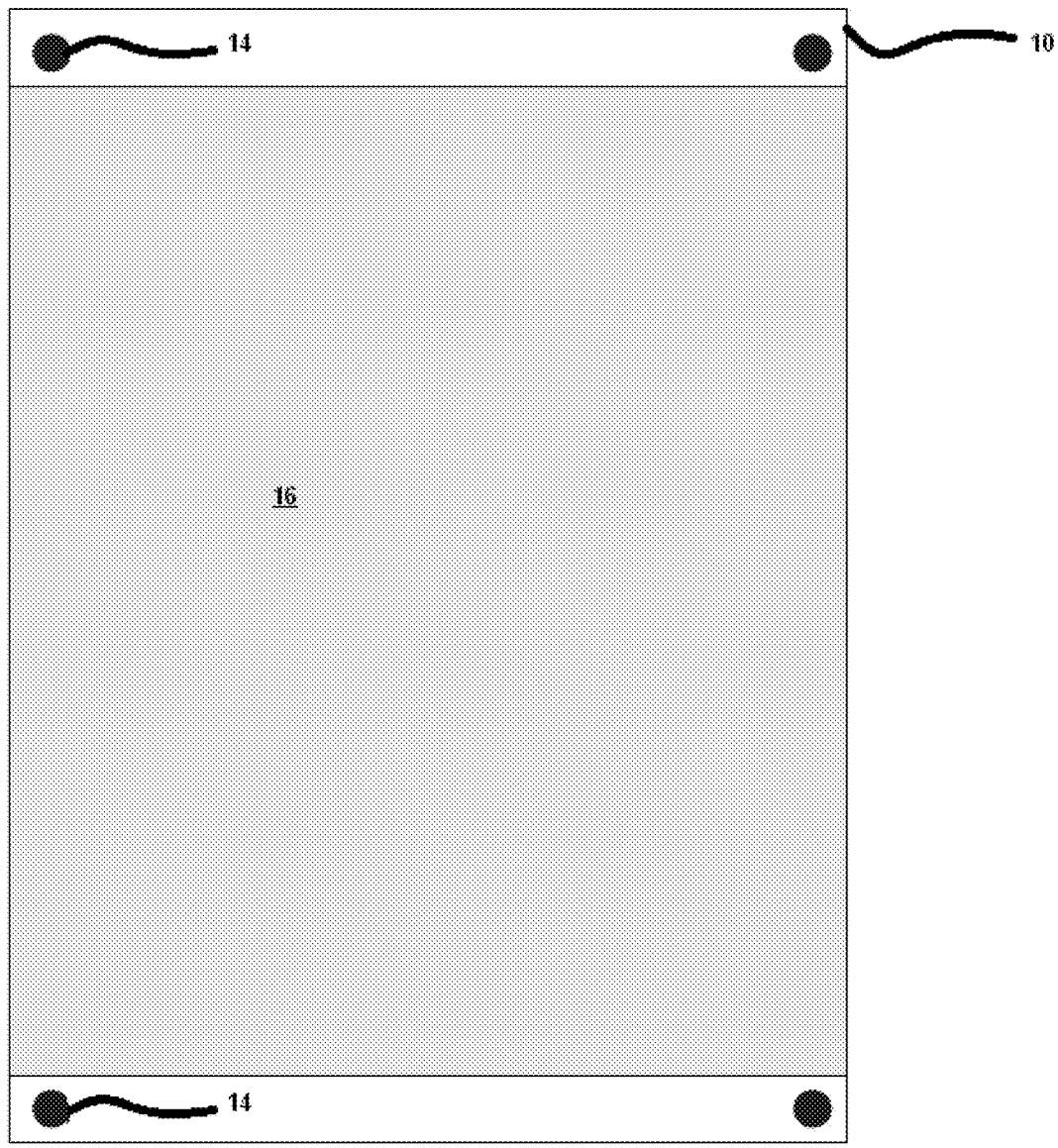
FIG. 2 is a perspective view of the release film having the plurality of transferrable images printed thereon covered by a backing layer.

After forming images 12 and registration marks 14, a backing layer 16 is formed on release film 10 over the images 12. As best shown in FIG. 2, backing layer 16 is formed over a majority of the surface 18 of release film 10, with the exception of registration marks 14. Backing layer 16 may be formed by the above-noted ink jet process using an opaque ink such as a plastisol, which is a suspension of PVC particles in a liquid plasticizer. Alternatively, backing layer 16 may be formed using a roller or gravure coating device, or by using a screen printing process. A screen printing process can be used because no special configuration is required for the screen to form the backing layer 16.

Backing layer 16, although preferably opaque, should not be limited thereto. In this regard, backing layer 16 may be transparent or at least semi-transparent without departing from the scope of the present disclosure. Backing layer 16 serves as a layer that, when the image 12 is finally transferred to a substrate (not shown) such as fabric or some other type of substrate, will be located between the image 12 and the substrate. Backing layer 16, therefore, may assist in adhering the image 12 to the substrate after the image 12 has been transferred to the substrate.

Figure 3:
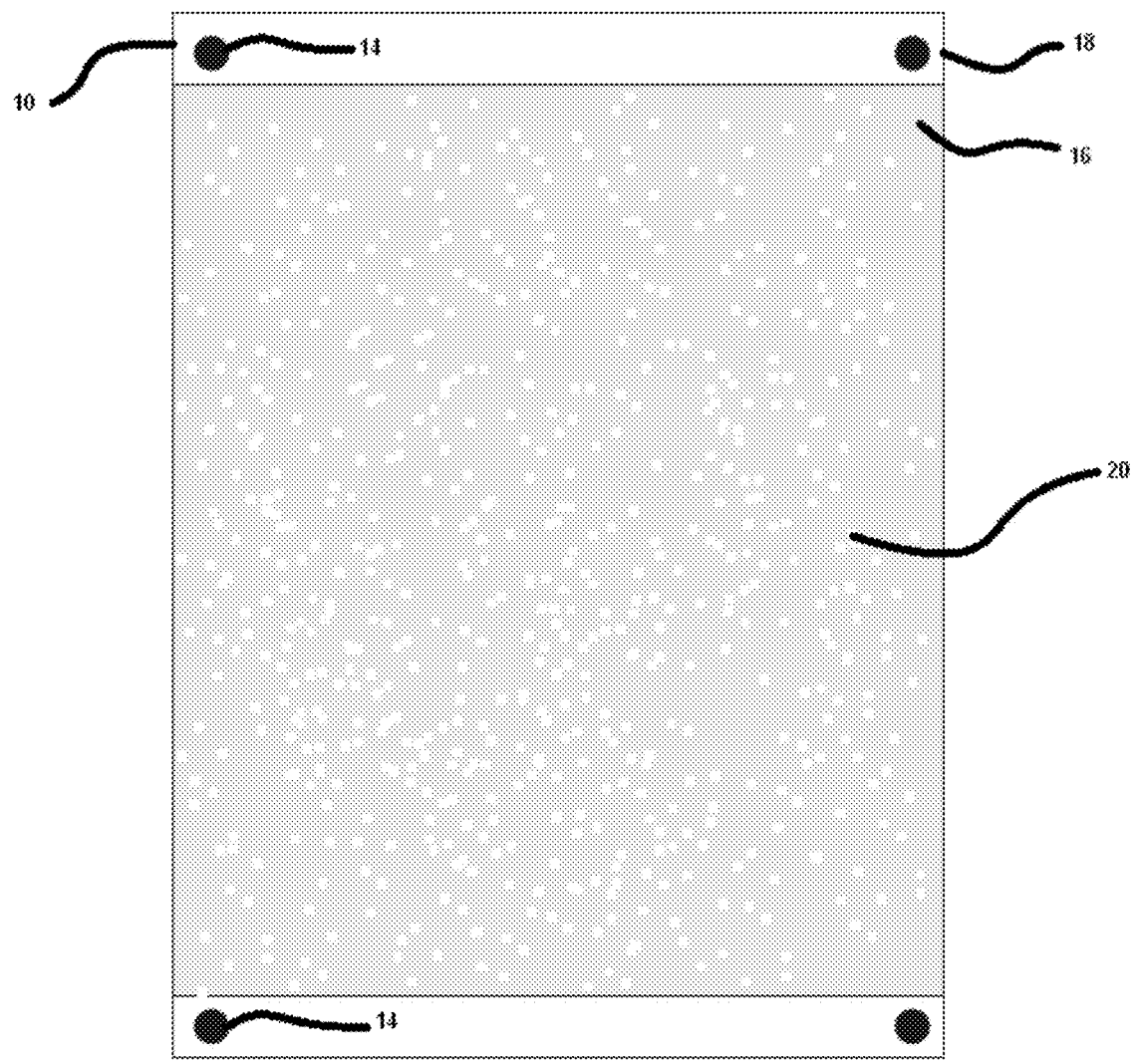
FIG. 3 is a perspective view of the release film having the plurality of transferrable images printed thereon covered by the backing layer, with an adhesive layer covering the backing layer.

Now referring to FIG. 3, it can be seen that after forming backing layer 16 over the image 12 formed on the release film 10, an adhesive layer 20 is formed over the backing layer 16. In one embodiment, adhesive layer 20 may be formed from a powder adhesive that is sprinkled over backing layer 16. Alternatively, release film 10 including the image 12 and backing layer 16 may be placed in a tray containing the powder adhesive and submerged in the powder adhesive. Regardless, the powder adhesive that will form adhesive layer 20 adheres to the backing layer 16. Backing layer 16, therefore, should be in a semi-liquid or gel-like state to ensure that the powder adhesive adheres to the backing layer 16. Further, it is important to note that registration marks 14 are not covered by adhesive layer 20 so that registration marks 14 are not obscured in any way. Any type of powder adhesive known to one skilled in the art may be used. Exemplary powder adhesives include copolyamides and copolyesters. The present disclosure, however, should not be limited to these materials.

In another embodiment, adhesive layer 20 may be formed over backing layer 16 using a liquid adhesive. Liquid adhesives are well known in the art of image transfer, and any known liquid adhesive may be used to form adhesive layer 20. Liquid adhesive can be deposited onto backing layer 16 using a screen printing method in a manner similar to forming backing layer 16, an ink jet method, a roller method, a gravure method, or any other method known to one skilled in the art. If adhesive layer 20 is formed using a liquid adhesive, it should be understood that backing layer 16 should be substantially dry to the touch before adhesive layer 20 is provided thereon.

In yet another embodiment, adhesive layer 20 may be in the form of an adhesive sheet that is adhered to backing layer 16. The adhesive sheet (not shown) can include a pressure-sensitive adhesive and/or a heat-sensitive adhesive. In this regard, one side of the adhesive sheet can include a pressure-sensitive adhesive that is adhered to backing layer 16 by pressing, and an opposing side of adhesive sheet can include a heat-sensitive adhesive that adheres the adhesive layer 20 to the final substrate (not shown) using heat and pressure.

Figure 4:
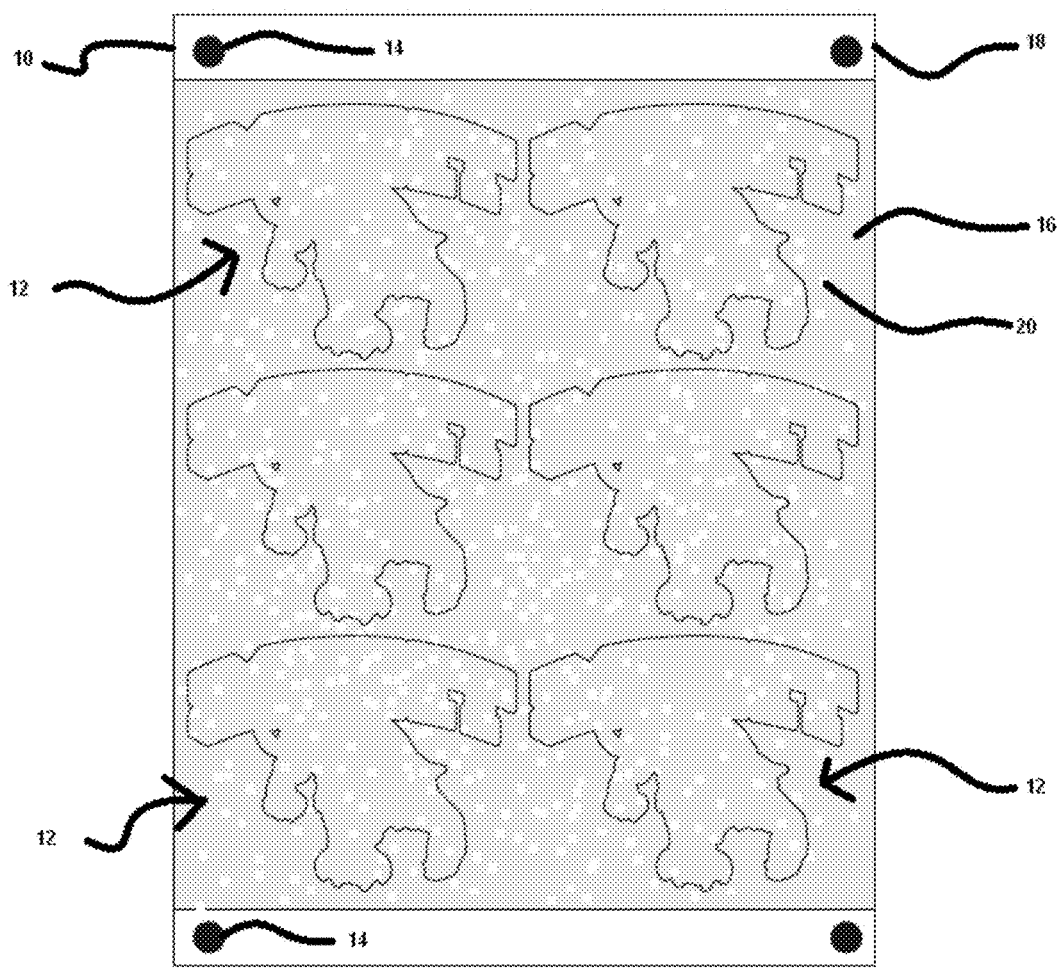
FIG. 4 is a perspective view of the release film having the plurality of transferrable images printed thereon, covered by the backing layer, with an adhesive layer covering the backing layer, and showing cut lines where the images, backing layer, and adhesive layer will be cut.

Now referring to FIG. 4, it can be seen that the release film 10 is ready for cutting. In this regard, in one embodiment, a die cutting device (not shown) having dies that correspond to each of the plurality of images 12 may be used to "kiss cut" through the adhesive layer 20 and backing layer 16 without penetrating the release film 10. Kiss Cutting is a form of die cutting where a very light impression of the dies cuts through various layer(s), without penetrating one or more bottom-most layers. The die cutting device is designed and shaped such that when the die cutting device is aligned with registration marks 14, the dies will correctly correspond to each of the plurality of images 12 so that the dies can be used to penetrate the adhesive layer 20 and backing layer 16, without disturbing the images 12. The die cutting device may also include dies that cut off the regions 22 of the release film 10 that includes the registration marks 14.

It should also be understood that a die cutting device having dies that correspond to the shapes of the images 12 is not necessarily used. In this regard, in another embodiment, a cutting tool or blade (not shown) that is programmed to cut around each of the images 12 may be used. Such a cutting tool omits the need for individual dies being manufactured that correspond to each image 12.

Further, in yet another embodiment, a laser cutting device (now shown) may be used to cut through the adhesive layer 20 and backing layer 16 without penetrating the release film. The laser cutting device can be configured to "cut" through different depths by adjusting an intensity of the laser, or altering the speed at which the laser cutting device is translated about the image during the cutting process.

Figure 5:
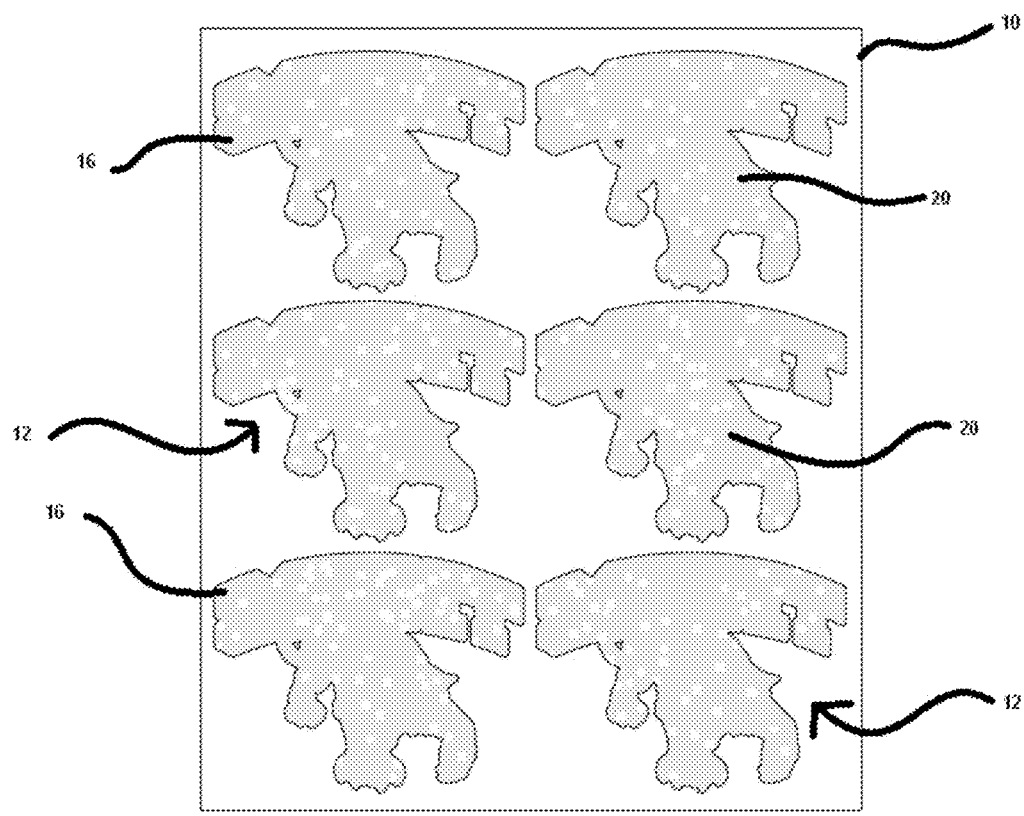
FIG. 5 is a perspective view of the release film in a state after cutting.

Now referring to FIG. 5, it can be seen that after subjecting the release film 10 to cutting using any of the above-noted methods (i.e., die-cutting, tool cutting, or laser cutting), the backing layer 16 and adhesive layer 20 surrounding each image 12 are removed. The images 12 containing the remaining portions of the backing layer 16 and adhesive layer 20 are now ready for transfer to the final substrate upon which the images 12 will be transferred. Before transferring the images 12 to the final substrate, the release film 10 may be cut at locations between the images 12 such that individual images 12 may be transferred to respective final substrates, as desired.

Lastly, the images 12 including the backing layer 16 and adhesive layer 20 may be transferred to the final substrate. To transfer the images 12, the images 12 are placed on the final substrate such that the adhesive layer 20 contacts the final substrate. Then, heat and pressure are applied to the images 12. The heat and pressure may be applied to the image 12 in a direction from underneath the final substrate, or the heat and pressure may be applied to the image 12 in a direction from over the release film 10. After sufficient heat and pressure is applied to ensure satisfactory transfer of the image 12 to the final substrate, the release film 10 may be peeled away from the image 12.

The above method is superior to previous image transfer processes such as digital printing because there is no need to used rolled printable media. In contrast, individual sheets of release films can be used, which reduces manufacturing costs. In addition, the method of the present disclosure omits the need for applying a mask that surrounds each of the images 12. This also reduces manufacturing costs because the materials associated with the mask, and the steps associated with using a mask, are omitted. Moreover, the above method is superior to screen printing because there is no need to manufacture a separate screen for each image that is to be transferred. Lastly, because the images 12 are formed using, for example, an ink jet printing process, the number and types of images that may be printed is substantially increased. Further, ink jet printing allows for different colors, gradients, and different effects to be printed that are not possible using a conventional screen printing process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for transferring an image to a substrate, comprising:
   providing a transfer medium having at least one registration mark;
   printing an image on the transfer medium;
   covering the image with a backing layer, the backing layer not covering the registration mark;
   covering the backing layer with an adhesive layer;
   penetrating the adhesive layer and the backing layer with a cutting device at locations around the image, the penetrating of the adhesive layer and backing layer not penetrating the transfer medium;
   removing portions of the adhesive layer and backing layer from the locations around the image; and
   transferring the image to the substrate.

2. The method according to claim 1, wherein the image is printed using an ink jet printing device.

3. The method according to claim 1, wherein the backing layer is opaque.

4. The method according to claim 1, wherein the transfer medium is transparent.

5. The method according to claim 4, wherein the transfer medium is formed from a polymeric material.

6. The method according to claim 1, wherein the cutting device is designed to align with the registration marks.

7. The method according to claim 6, wherein the cutting device is a laser cutting device.

8. The method according to claim 6, wherein the cutting device is an automated cutting tool.

9. The method according to claim 1, wherein the step of transferring the image to the substrate includes applying heat and pressure to the image.

10. The method according to claim 9, further comprising peeling the transfer medium from the transferred image.

11. A method for transferring an image to a substrate, comprising:
    providing a transfer medium having at least one registration mark;
    printing an image on the transfer medium;
    covering the image with a backing layer and/or an adhesive layer, the backing layer and/or the adhesive layer not covering the registration mark;
    penetrating the backing layer and/or the adhesive layer with a cutting device at locations around the image, the penetrating of the backing layer and/or the adhesive layer not penetrating the transfer medium;
    removing portions of the backing layer and/or the adhesive layer from the locations around the image; and
    transferring the image to the substrate.

12. The method according to claim 11, wherein the image is printed using an ink jet printing device.

13. The method according to claim 11, wherein the backing layer is opaque.

14. The method according to claim 11, wherein the adhesive is a liquid adhesive that is applied using a screen printing method or an ink jet method.

15. The method according to claim 11, wherein the transfer medium is transparent.

16. The method according to claim 15, wherein the transfer medium is formed from a polymeric material.

17. The method according to claim 11, wherein the cutting device is designed to align with the registration marks.

18. The method according to claim 17, wherein the cutting device is a laser cutting device.

19. The method according to claim 17, wherein the cutting device is an automated cutting tool.

20. The method according to claim 11, wherein the step of transferring the image to the substrate includes applying heat and pressure to the image.

21. The method according to claim 11, further comprising peeling the transfer medium from the transferred image.

* * * * *